Feb. 1, 1955 M. RACHLIN 2,701,115
DOWNSPOUT HOOK
Filed June 18, 1948
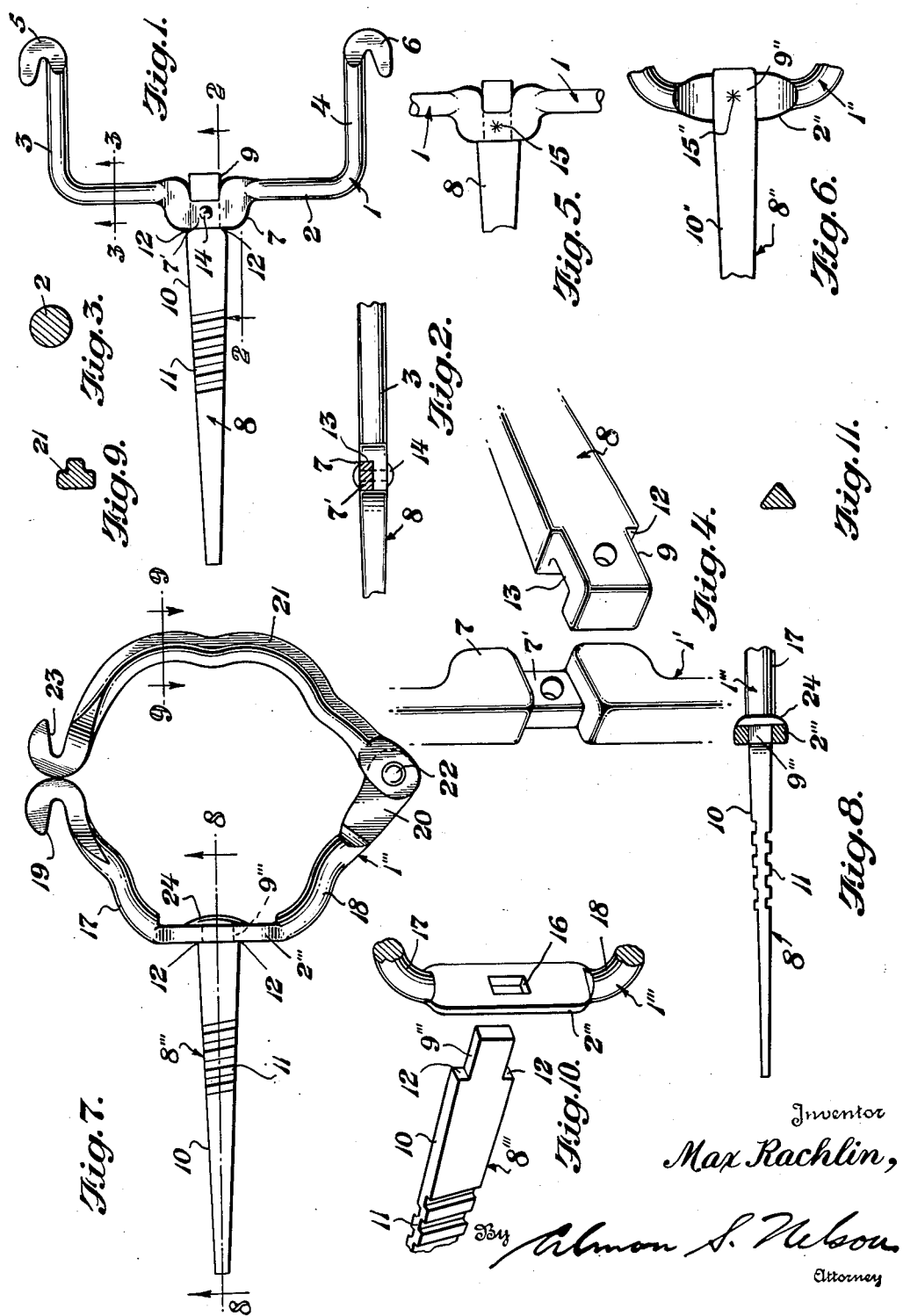
Inventor
Max Rachlin,
By Almon S. Nelson
Attorney

United States Patent Office 2,701,115
Patented Feb. 1, 1955

2,701,115

DOWNSPOUT HOOK

Max Rachlin, Flushing, N. Y.; Helen Pollock and Eva Rachlin, executrices of said Max Rachlin, deceased Application June 18, 1948, Serial No. 33,892

1 Claim. (Cl. 248—71)

This invention relates to downspout hooks and the primary object of the invention is to provide a downspout hook having hardened portions at the point of connection of the driving tang thereto whereby the hook is not distorted by the driving of the tang.

A further object of the invention is to provide a novel means for connecting a driving tang to a downspout hook whereby the driving force is transmitted directly to and through the driving tang.

A further object of the invention is to provide a driving tang made from metal which possesses greater strength than the strength of the metal initially, and one which has no weakened twisted portions and is not damaged by hammering.

Other and further objects of the invention will become apparent as the description proceeds, reference being made to the accompanying drawings forming a part of the present disclosure, wherein:

Fig. 1 is a plan view of one form of downspout hook constructed in accordance with my invention;

Fig. 2 is a sectional view taken in the plane of line 2—2 of Fig. 1;

Fig. 3 is a sectional view taken in the plane of line 3—3 of Fig. 1;

Figs. 4, 5 and 6 are fragmentary plan views of modifications;

Fig. 7 is a plan view of another modified form of downspout hook;

Figs. 8 and 9 are sectional views taken in the plane of lines 8—8 and 9—9, respectively, of Fig. 7;

Fig. 10 is a fragmentary, perspective view of the downspout hook illustrated in Fig. 7 before assembly and riveting; and Fig. 11 is a sectional view illustrating a modified cross-sectional shape of hook.

In Figs. 1 to 3 of the drawing, I have shown a downspout hook adapted to receive a rectangular downspout. In this form of the invention, the hook portion 1 comprises a base 2 of circular or any other desired configuration in cross-section, arms 3 and 4 extending outwardly from the ends thereof and provided with flattened, rearwardly bent, terminal portions 5 and 6, respectively.

The central portion 7 of the base 1 is bent into a U-shape, as illustrated, and this portion of the hook is flattened and thereby hardened to resist deformation.

A metallic driving tang 8 is connected to the hardened central portion 7 of the hook, such hardened central portion projecting outwardly beyond both edges of the driving tang. The driving tang 8 comprises a driving end portion 9 and a driven end portion 10 which are formed by a die-pressing operation whereby both portions of the tang are hardened and possess greater strength than the strength of the metal initially. The driven end portion 10 tapers inwardly, from the driving end portion 9 thereof in both width and thickness, and is provided with transverse retaining serrations 11.

The driving end portion 9 of the driving tang 8 is of reduced width to provide shoulders 12 between the portion 9 and the adjacent end of the tapered portion 10. Also, a transverse recess 13 is provided in this driving end portion 9, and said recess receives the base portion 7' of the flattened U-shaped member 7.

A rivet 14 extends through the driving end portion 9 of the driving tang 8 and the said base portion 7' of the member 7 to secure the hook portion 1 to the driving tang 8. It will be noted that the driving end 9 of the tang 8 extends slightly above the base 2 of the hook portion 1 whereby the driving force is applied directly to and through the driving tang 8. It will also be noted that the shoulders 12 of the driving tang engage the base 7' of the U-shaped base member 7 to prevent rotational movement of the driving tang 8 relative to the hook portion 1 and thus provide a rigid connection.

Fig. 4 illustratives a slightly modified form of hook portion 1'. As illustrated, the hook portion 1' is of rectangular cross-section rather than circular as illustrated in Fig. 3. Otherwise the downspout hook illustrated in Fig. 4 is substantially the same as that illustrated in Figs. 1 to 3 and hence similar reference numerals are used to designate the parts.

Referring to Figs. 2 and 4, it will be seen that the base portion 7' of the base member 7 is offset forwardly whereby a flush connection is provided between the driving tang 8 and the hook portions 1 or 1'.

The modified form of the invention illustrated in Fig. 5 is identical with that illustrated in Figs. 1 to 3 except that the driving tang 8 is connected to the hook portion 1 by welding, as indicated at 15, instead of a rivet.

In the modified form of the invention illustrated in Fig. 6, the base portion 2'' of the hook portion 1'' is merely flattened to harden the same and receive flush thereagainst the driving end portion 9'' of a driving tang 8''. The driving tang 8'' has a tapered end portion 10'' and the driving end portion 9'' thereof is welded to the flattened base portion 2'' of the hook portion 1'' as indicated at 15''. As illustrated, the driving end portion 9'' of the tang extends slightly beyond the base portion 2'' of the hook portion whereby the driving force is transmitted directly to and through the driving tang 8''. Furthermore, the hardened base portion 2'' projects outwardly beyond both edges of the driving tang 8''. The hook portion 1'' illustrated is particularly designed to embrace a circular or oval downspout.

In Figs. 7 to 10, I have shown another modified form of downspout hook including a modified form of means connecting the driving tang to the hook portion thereof. The hook illustrated in these figures is particularly adapted to embrace an oval or hexagonal downspout, and the hook portion 1''' comprises a base 2''' flattened by a force applied parallel with the plane of the hook portion. The base 2''' is provided with a rectangular or other non-circular opening 16, and arms 17 and 18 extending outwardly from the ends thereof. The arms 17 and 18 diverge and are provided with terminal portions 19 and 20 flattened by a force applied at right angles to the plane of the hook. An arm 21 of similar configuration, except that no flattened portion such as 2''' is provided, is pivotally connected at 22 to the flattened portion 20 and this arm is adapted to snugly engage the downspout. The terminal portion 19 is rearwardly bent, as is also the terminal portion 23 of the arm 21, and wires may be passed around the terminal portions 19 and 23 to secure the arm 21 to the hook portion 1'''.

A driving tang 8''' is connected to the base 2'''' of the hook portion 1'''. The driving tang 8''' is identical in structure to the driving tang 8, except that the transverse recess 13 is omitted. Thus the tang 8''' comprises a driven end portion 10 tapering in width and thickness and provided with transverse retaining serrations 11, and a driving end portion 9''' of reduced width providing shoulders 12 between the portion 9''' and the adjacent end of the tapered portion 10.

The driving tang 8''' is secured to the hook portion 1''' by passing the reduced end portion 9''' through the opening 16 and riveting the end thereof as indicated at 24. As before, the end 24 of the driving tang 8''' extends above the base 2'''' of the hook portion and thus the driving force is applied directly to and through the driving tang 8'''. Also, as before, the flattened, hardened base 2'''' projects outwardly beyond both edges of the driving tang 8'''. The shoulders 12 engage the lower surface of the base 2'''' to provide a rigid connection between the driving tang and hook portion.

The hook portions 1, 1', 1'' and 1''' may be made from metal wire if desired, and the said wire may have any desired cross-sectional configuration, such as round (Fig. 3), rectangular (Fig. 4), T-shaped (Fig. 9) or triangular (Fig. 11). Also, the said hook portions may be shaped to receive rectangular, round, oval, hexagonal or any other shaped downspout.

As has been described above, the driving force, in each disclosed embodiment, is applied directly to and through the driving tang. Hence, the liability of the hook portion and driving tang to be separated at a welded or riveted connection is substantially entirely eliminated. In addition, each hook portion is hardened in the area thereof to which the driving tang is connected and thus a rigid connection between the driving tang and hook portion is obtained, and also, a misdirected blow of a hammer will therefore not damage the hook portion. Additionally, such hardened portion in the modification illustrated in Figs. 7 to 10, prevents the base portion from swelling when the rivet is formed; and the opening 16 extending through the hardened base portion does not weaken such portion to the extent that it will be distorted by the driving of the tang.

The preferred method of forming the driving tangs disclosed herein, is disclosed and claimed in my copending application Serial No. 33,893, filed of even date herewith, now abandoned.

I claim:

A downspout hook comprising a solid driving tang and a hook portion made from wire stock; said driving tang comprising an elongate driven end portion tapering in width and thickness, and a driving end portion provided with an open transverse recess and having a width less than the adjacent end of said driven end portion, whereby shoulders are provided between said driven and driving end portions; said hook portion including a base provided with a substantially U-shaped bend, said base having a transverse recess providing a second set of shoulders, said shoulders of said driving tang engaging said base and said transverse recess thereof receiving the recess of said base portion of said U-shaped bend, and means securing said driving tang to said base portion of said U-shaped bend.

References Cited in the file of this patent

UNITED STATES PATENTS

| | | |
|---|---|---|
| Re. 22,992 | Rachlin | Mar. 30, 1948 |
| 345,477 | Berger | July 13, 1886 |
| 540,750 | Minnemeyer | June 11, 1895 |
| 1,476,764 | Morhoff et al. | Dec. 11, 1923 |
| 1,586,024 | Boyd | May 25, 1926 |
| 1,967,660 | Cestone | July 24, 1934 |
| 2,263,271 | Lazarides | Nov. 18, 1941 |
| 2,365,971 | Rachlin | Dec. 26, 1944 |

FOREIGN PATENTS

| | | |
|---|---|---|
| 102,463 | Australia | Nov. 25, 1937 |